US010032170B2

(12) United States Patent
Crowell et al.

(10) Patent No.: US 10,032,170 B2
(45) Date of Patent: *Jul. 24, 2018

(54) MULTI FACTOR AUTHENTICATION RULE-BASED INTELLIGENT BANK CARDS

(71) Applicant: International Business Machines Corporation, Armonk, NY (US)

(72) Inventors: Susan F. Crowell, Rochester, MN (US); Jason A. Nikolai, Rochester, MN (US); Andrew T. Thorstensen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 603 days.

This patent is subject to a terminal disclaimer.

(21) Appl. No.: 14/568,289

(22) Filed: Dec. 12, 2014

(65) Prior Publication Data
US 2015/0100487 A1  Apr. 9, 2015

Related U.S. Application Data

(63) Continuation of application No. 14/018,555, filed on Sep. 5, 2013.

(51) Int. Cl.
G06Q 20/00 (2012.01)
G06Q 20/40 (2012.01)
(Continued)

(52) U.S. Cl.
CPC ....... G06Q 20/409 (2013.01); G06K 9/00308 (2013.01); G06Q 20/1085 (2013.01);
(Continued)

(58) Field of Classification Search
CPC ............... G06Q 20/409; G06Q 20/382; G06Q 20/3674; G06Q 20/04; G06Q 20/40; G06Q 30/06
(Continued)

(56) References Cited

U.S. PATENT DOCUMENTS 8,127,982 B1 * 3/2012 Casey ............ G06Q 20/35785
235/379
2005/0167482 A1  8/2005 Ramachandran et al.
(Continued)

FOREIGN PATENT DOCUMENTS

WO       2012089906 A1    7/2012
WO    WO 2012/089906    *  7/2012  ............. G10L 25/63
WO    WO 2012089906 A1 *  7/2012  ....... H04N 21/42203

OTHER PUBLICATIONS

Appendix P: List of IBM Patents or Patent Applications Treated as Related.
(Continued)

Primary Examiner — Kito R Robinson
Assistant Examiner — Benjamin Brindley
(74) Attorney, Agent, or Firm — Patterson + Sheridan, LLP

(57) ABSTRACT

System, method, and computer program product to implement four factor authentication rule-based intelligent bank cards, by receiving valid authentication information for a card associated with an account, verifying that a captured image of a person presenting the card matches an image of an authorized user of the account, analyzing the captured image to detect an emotion of the person, and performing a predefined operation to control access to the account upon determining that the detected emotion satisfies an emotion rule associated with the account.

9 Claims, 3 Drawing Sheets

(51) Int. Cl.
  G06Q 20/34    (2012.01)
  G06Q 20/10    (2012.01)
  G06K 9/00     (2006.01)

(52) U.S. Cl.
  CPC ........... *G06Q 20/34* (2013.01); *G06Q 20/341* (2013.01); *G06Q 20/4093* (2013.01); *G06K 9/00892* (2013.01)

(58) Field of Classification Search
  USPC .......................................................... 705/64
  See application file for complete search history.

(56) References Cited

U.S. PATENT DOCUMENTS

| 2009/0110248 | A1 | 4/2009 | Masuda et al. |
| 2009/0190803 | A1* | 7/2009 | Neghina ............... H04N 5/232 382/118 |
| 2010/0123588 | A1* | 5/2010 | Cruz Hernandez ............... A61B 5/02438 340/573.1 |
| 2011/0191250 | A1* | 8/2011 | Bishop ................. G06Q 20/027 705/67 |
| 2011/0224509 | A1* | 9/2011 | Fish ..................... A61B 5/0002 600/301 |
| 2012/0002848 | A1* | 1/2012 | Hill ....................... A61B 5/164 382/118 |
| 2012/0286034 | A1* | 11/2012 | Smith ................. G06Q 20/042 235/379 |
| 2012/0292388 | A1* | 11/2012 | Hernandez .......... G06Q 20/108 235/379 |
| 2015/0066764 | A1 | 3/2015 | Crowell et al. |

OTHER PUBLICATIONS

U.S. Appl. No. 14/018,555, entitled Multi Factor Authentication Rule-Based Intelligent Bank Cards, filed Sep. 5, 2013.

* cited by examiner

| ACCOUNT 301 | PERSON 302 | ACCOUNT USER ID 303 | EMOTION RULE ID 304 | EMOTION 305 | ACTION 306 |
|---|---|---|---|---|---|
| 12345 | PETE | 001 | 001 | SCARED | $20 MAX WITHDRAWAL |
| 12345 | PETE | 001 | 002 | NERVOUS | SMS ALERT/VERIFICATION CODE |
| 12345 | PETE | 001 | 003 | CATCHALL | $200 MAX WITHDRAWAL |
| 12345 | JONAS | 002 | 004 | SCARED | $0 MAX WITHDRAWAL |
| 23456 | MARY | 003 | 005 | NERVOUS | $100 MAX WITHDRAWAL, CALL PRIMARY CARDHOLDER |
| 23456 | JOE | 001 | 006 | FEAR | END TRANSACTION |
| 23456 | JASON | 002 | 007 | CATCHALL | $200 MAX WITHDRAWAL IF ATM>50 MILES FROM HOME; $400 MAX WITHDRAWAL IF ATM < 50 MILES FROM HOME |
| 23456 | JASON | 002 | 008 | FEAR | $20 MAX WITHDRAWAL |

MULTI FACTOR AUTHENTICATION RULE-BASED INTELLIGENT BANK CARDS

CROSS-REFERENCE TO RELATED APPLICATIONS

This application is a continuation of co-pending U.S. patent application Ser. No. 14/018,555, filed Sep. 5, 2013. The aforementioned related patent application is herein incorporated by reference in its entirety.

BACKGROUND

The present disclosure relates to banking, and more specifically, to four factor authentication rule-based intelligent bank cards.

Fraud has historically plagued the financial industry. Debit cards currently use two-factor authentication, namely the card itself and a pin number associated with the card/account. However, if the card is stolen and the PIN becomes known, an unauthorized user may withdraw funds from a victim's account at an ATM machine. Therefore, there exists a need for enhanced security measures for debit cards.

SUMMARY

Embodiments disclosed herein provide a system, method, and computer program product to implement four factor authentication rule-based intelligent bank cards, by receiving valid authentication information for a card associated with an account, verifying that a captured image of a person presenting the card matches an image of an authorized user of the account, analyzing the image to detect an emotion of the person, and performing a predefined operation to control access to the account upon determining that the detected emotion satisfies an emotion rule associated with the account.

BRIEF DESCRIPTION OF THE SEVERAL VIEWS OF THE DRAWINGS

FIG. 3 illustrates a data structure to store predefined rules and actions based on detected emotions, according to one embodiment.

DETAILED DESCRIPTION

Embodiments disclosed herein provide enhanced security and additional functionality for debit cards by applying actions based on emotion detection. Embodiments disclosed herein leverage existing cameras in ATM machines to perform a third and fourth authentication factor, namely analyzing an image of a person presenting a card to the ATM machine to verify that the person is an authorized user on the account associated with the card, and analyzing the person's expressed emotions to detect suspicious behavior. For example, if the person is scared, nervous, or agitated, predefined rules associated with the account may control, limit, or restrict account access by performing any number of predefined actions. The predefined actions include, but are not limited to, completely restricting access to the account, imposing a maximum withdrawal, alerting an account holder of record, prompting the account holder to enter a security code sent to the account holder via SMS or email, and the like.

Stated differently, the third and fourth factors are what you are and how you act. Embodiments disclosed herein apply facial recognition as the third factor to ensure that the person presenting the debit card is an authorized user under the account by comparing a captured image of the person at the ATM machine to stored images of authorized users. The images may be stored on a remote server, on the card itself, or any other feasible location. Once the facial recognition process is successfully completed, embodiments disclosed herein implement facial expression algorithms as the fourth authentication factor. If the facial recognition algorithms determine that the card holder is worried, scared, or any other emotion based on the algorithm, a predefined action may be performed. Virtually any action that can be configured an automated is completed as a predefined action responsive to the detected emotions.

Additionally, embodiments disclosed herein allow for the application of custom rules to each user's account, or to shared accounts held groups such as family members or businesses. For example, person A may be able to withdraw $500, while person B may have no limit, but an SMS alert is sent whenever a withdrawal occurs. Therefore, embodiments disclosed herein expand the usage of ATM cards, debit cards, or any type of instrument used to access accounts, from the current "one card one user" paradigm to a "one card to many users with controls in place" paradigm. Advantageously, embodiments disclosed herein may enhance security without weakening existing security measures, such as the PIN number scheme. The rules may be defined by the user, the financial institution, or both.

Figure 1:
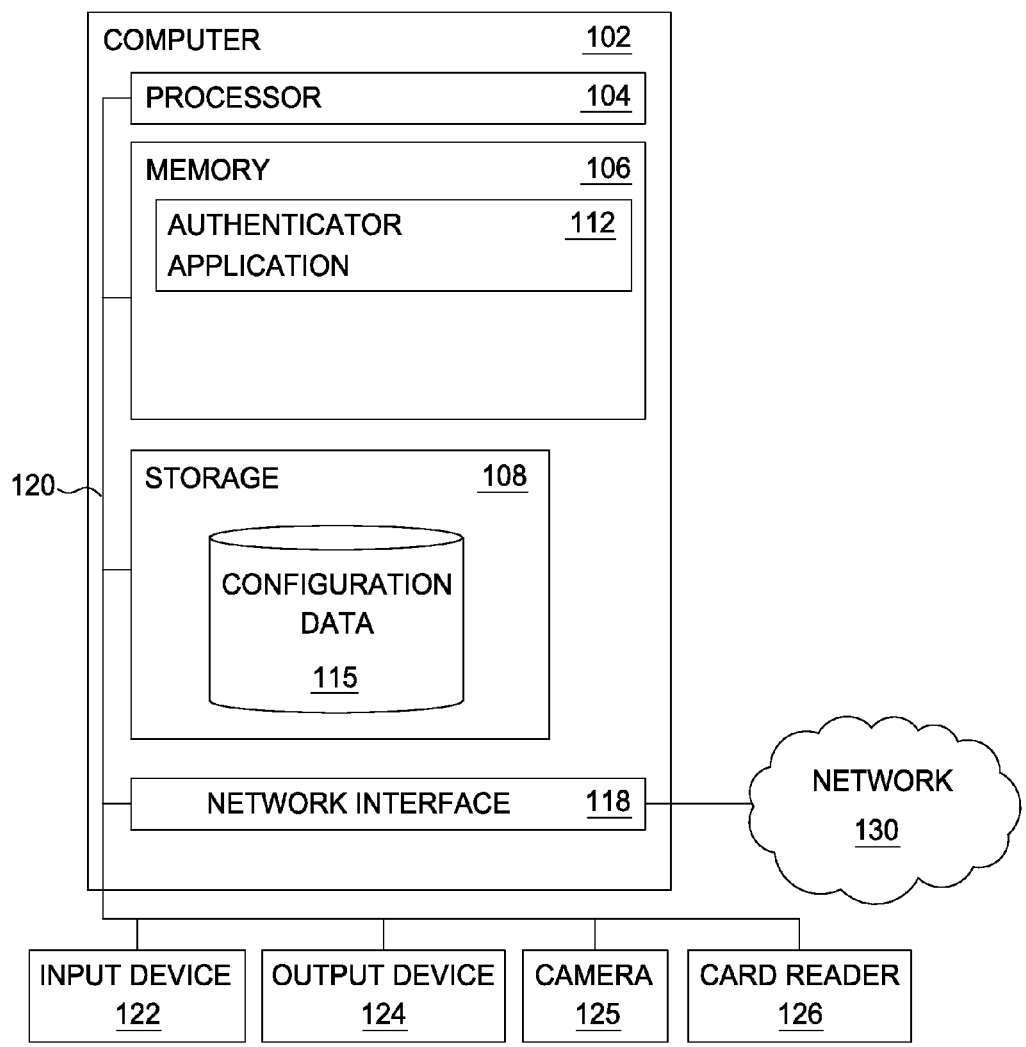
FIG. 1 illustrates a system for four factor authentication rule-based intelligent bank cards, according to one embodiment.

FIG. 1 illustrates a system 100 for four factor authentication rule-based intelligent bank cards, according to one embodiment. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. The network interface device 118 may be any type of network communications device allowing the computer 102 to communicate with other computers via the network 130. The computer 102 also includes a camera 125 capable of capturing still images and video and a card reader 126. The card reader may be any type of card reader, including, but not limited to, a magnetic strip reader, near field communications (NFC) reader, smart card reader, and the like.

The storage 108 may be a persistent storage device. Although the storage 108 is shown as a single unit, the storage 108 may be a combination of fixed and/or removable storage devices, such as fixed disc drives, solid state drives, SAN storage, NAS storage, removable memory cards or optical storage. The memory 106 and the storage 108 may be part of one virtual address space spanning multiple primary and secondary storage devices.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

As shown, the memory 106 contains the authenticator application 112, which is an application generally configured to apply four factor authentication in fulfilling financial transactions. For example, when a user wishes to withdraw funds from an ATM, the authenticator application 112 may require a card, a PIN number, perform facial recognition of the person attempting to withdraw funds, and perform emotion analysis of the person attempting to withdraw funds. The authenticator application 112 may reference the configuration data 115 during multiple steps of a transaction in order to implement different predefined actions responsive to predefined conditions being satisfied. The authenticator application 112 may also include one or more facial recognition and emotion detection algorithms. For example, if the facial recognition analysis fails, the authenticator application 112 may control, limit, or restrict account access according to one or more predefined rules. Generally, any type of financial transaction may be managed by the authenticator application 112, such as wiring funds, issuing checks or other instruments, or making purchases.

As shown, storage 108 contains the configuration data 115, which stores user account information and associated rules for each account. The user account information, in addition to standard data, may include images of authorized users that may be used by the authenticator application 112 as part of the facial recognition analysis. The rules may be rules defined by the financial institution or by account holders. For any given account, multiple people may be authorized to access the account, and different rules may be applied to each person. The rules specified in the configuration data 115 may cause the authenticator application 112 to perform one or more predefined actions upon detecting one or more predefined events. For example, a user may specify that if the facial recognition algorithms fail to match a user to the images stored in the configuration data 115, an SMS containing a code may be sent to a phone number on file with an authentication code that the user can enter to access the account. Additionally, if the authenticator application 112 detects an emotion as part of its emotion analysis, it may reference the configuration data 115 to determine whether one or more rules specify to perform a predefined action. For example, if the emotion analysis indicates that the user is expressing fear, a predefined rule may immediately end the attempted transaction and lock the account pending further authentication.

Figure 2:
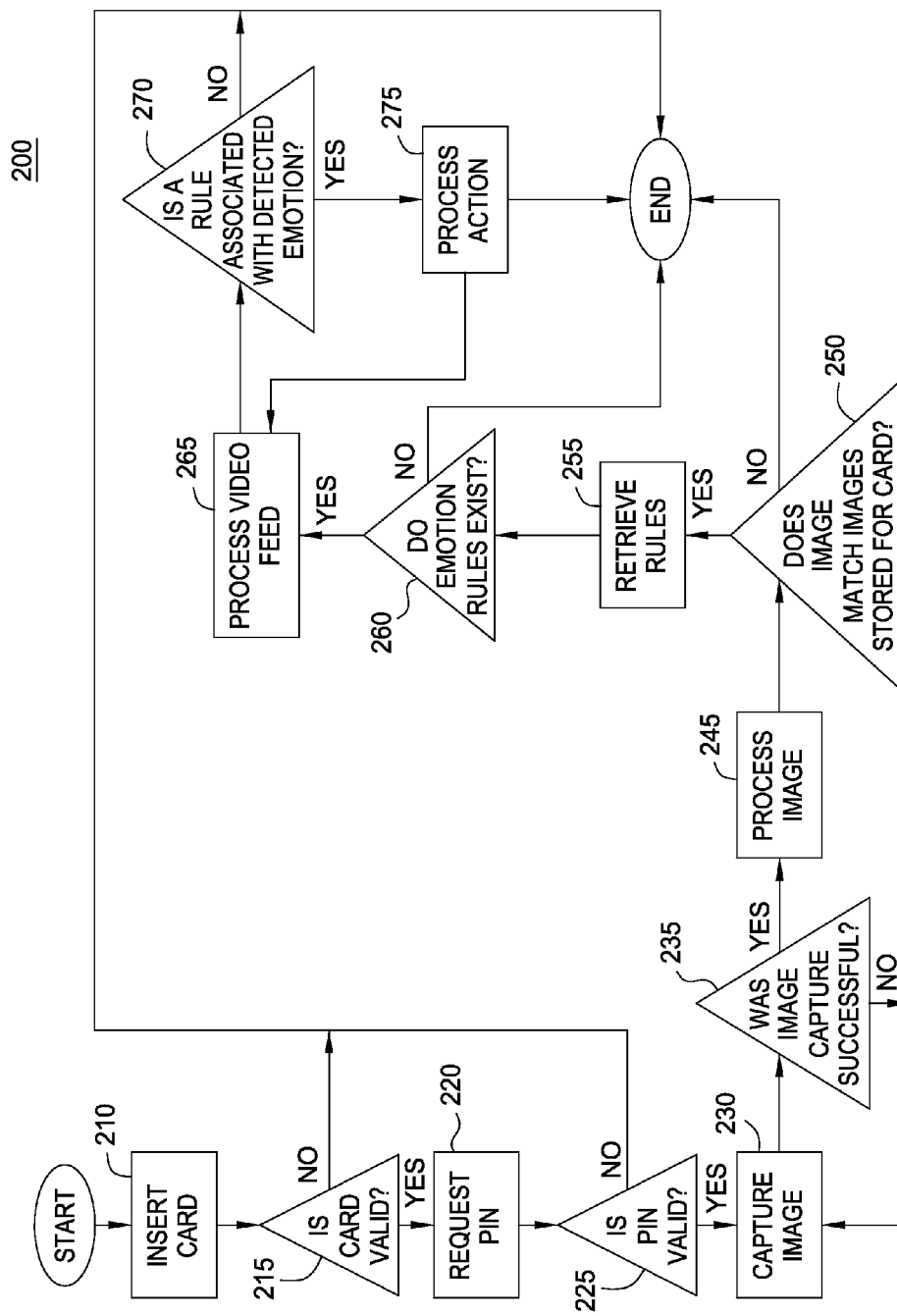
FIG. 2 illustrates a method for four factor authentication rule-based intelligent bank cards, according to one embodiment.

FIG. 2 illustrates a method 200 for four factor authentication rule-based intelligent bank cards, according to one embodiment. In one embodiment, the authenticator application 112 performs the steps of the method 200. Generally, the method 200 extends authentication techniques to include facial recognition and emotion analysis as additional authentication factors. Users can define any type of rule related to their account. The authenticator application 112 will in turn enforce the rules and corresponding predefined actions, such as limiting an amount of funds that can be withdrawn under specific circumstances.

At step 210, a user presents a card attempting to perform a financial transaction. At step 215, the authenticator application 112 attempts to read data stored in the card to determine whether the card is valid. If the card is not valid, the method 200 ends. If the card is valid, the method proceeds to step 220, where the authenticator application 112 requests that the user enter the correct PIN number to access the account. Generally, at step 220, the authenticator application 112 may request that the user enter any form or type of authentication code. At step 225, the authenticator application 112 determines whether the PIN number received from the user is valid. In one embodiment, the authenticator application 112 may reference the configuration data 115 to determine whether the PIN is correct. The authenticator application 112 may provide the user any number of attempts to correctly enter the PIN number. If the PIN is not valid, the authenticator application 112 may terminate the method 200 after the user has incorrectly entered it a threshold number of times. The financial institution or the user may set limits on the number of attempts that the authenticator application 112 may provide to the user. In other embodiments, authentication information other than PIN numbers may be implemented, such as any type of biometric security information, including but not limited to retina scanning, DNA identification, palm print reading, iris recognition, hand geometry recognition, and fingerprint reading. If the PIN is valid, the authenticator application 112 may capture an image of the user at step 230. At step 235, the authenticator application 112 determines whether the image capture is successful by applying an algorithm to the captured image to verify that the image can be used for facial recognition. If the image capture was not successful, the user may be notified at step 240. At step 240, the user may be asked to look into the camera for another image capture. After a predefined number of unsuccessful attempts, the card may be ejected (or retained by the machine), and the method 200 may end.

If the image capture was successful, the authenticator application 112 may process the image at step 245. In one embodiment, the authenticator application 112 may pull facial recognition data points from the captured image at step 245, for use by facial recognition algorithms. At step 250, the authenticator application 112 determines whether the captured image matches an image stored in the configuration data 115 for authorized users of the card. Generally, the authenticator application 112 may apply facial recognition algorithms to the captured image and the stored images. If the captured image does not match any image stored for the card, the authenticator application 112 may terminate the attempted transaction, and the method 200 may end.

At step 255, the authenticator application 112 may retrieve rules from the configuration data 115 related to the current account. The rules may be stored on the card or in a remote location. The rules may be associated with the PIN and the image of the user, as one card may have multiple user accounts, each account based on the person and their image, PIN, or image and PIN. In addition, different rules may be applied at this step. For example, one user may only have access to draw a specified amount of funds per day, week, year, etc, while another user may only be able to withdraw funds in specified geographic locations. At step 260, the authenticator application 112 determines whether emotion rules exist for the account. If no emotion rules exist, the method 200 may terminate. If the account holder has not specified any emotion rules, they may have decided to allow withdrawals or other transactions to occur without having the authenticator application 112 perform the emotion analysis.

If the account holder has specified emotion rules that should be applied to the transaction through emotion detection, the authenticator application 112, at step 265, processes the image (or video feed) to parse emotions from the image/video data. For example, the authenticator application 112 may determine that the user is nervous, angry, scared, or is exhibiting fear. At step 270, the authenticator application 112 determines whether a rule is associated with an emotion detected at step 265. The user (or financial institution) may implement any number of rules associated with different emotions. Additionally, a catchall emotion may be provided that specifies rules for the authenticator application 112 to apply when the detected emotion does not match an emotion for which a rule has been specified. At step 275, the authenticator application 112 processes the predefined action specified in the rules associated with the detected emotions. Some examples of predefined actions may include, but are not limited to, limiting withdrawal amounts if fear is detected, sending an SMS with an access code to a phone number associated with the account if nervousness is detected, or a catchall emotion may restrict the display of account information on the screen. The authenticator application 112 may continuously monitor the images/video feed to detect emotion and apply rules until the user logs out of the account.

FIG. 3 illustrates a data structure 300 storing predefined rules and actions based on detected emotions, according to one embodiment. As shown, the data structure 300 includes an account number 301, a person 302 corresponding to an authorized user of the account, an account user ID 303, an emotion ID 304, an emotion 305 corresponding to a predefined emotion (or a catchall), and an action 306 corresponding to an action implemented responsive to detecting the corresponding emotion 305. The data structure 300 may also include other data that is not shown, such as images of the users. The rules and actions defined in the data structure 300 may be user defined, or defined by the financial institution. As shown, for example, an emotion rule ID 001 has been defined for user Pete associated with account number 12345. The emotion rule ID 001 specifies that if the person attempting to access the account is scared, the maximum that can be withdrawn from the account is $20. In addition, the balance displayed to Pete may be masked or otherwise limited. For example, a $20 balance may be displayed to Pete, as that is the maximum amount he can withdraw, even though the balance in the account may be greater, such as $10,000. Jonas, another authorized user of account 12345, cannot withdraw any funds if the detected emotion is scared, as $0 is the maximum withdrawal allowed in emotion rule ID 004.

As shown, for account 23456, a catchall emotion rule ID 007 has been defined for user Jason. The catchall serves to cover detected emotions other than a predefined emotion, such as the fear emotion associated with emotion rule ID 008. So while emotion rule 008 specifies that Jason (or someone acting as Jason) can only withdraw $50 if fear is detected, emotion rule 007 specifies that more money can be withdrawn for unspecified emotions. Additionally, emotion rule ID 007 places geographic restrictions on how much money can be withdrawn, namely a $200 maximum withdrawal if the ATM is more than 50 miles from Jason's home address, while a $400 maximum withdrawal may be made if the ATM is less than 50 miles from his home.

Advantageously, embodiments disclosed herein provide enhanced security when authenticating a user attempting to perform a financial transaction by implementing facial recognition and emotion detection algorithms to thwart fraudulent activity. Embodiments disclosed herein ensure that the person attempting to withdraw funds matches an image of an authorized user, and detect emotions of the person to ensure that they are not being coerced into withdrawing funds. Even if an unauthorized user gets past the facial recognition analysis, emotions associated with criminal behavior will trigger the predefined actions to limit the amount of loss, if any, caused.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications, such as the authenticator application or related data available in the cloud. For example, the authenticator application could execute on a computing system in the cloud and perform four factor account authentication. In such a case, the authenticator application could perform four factor authentication and store predefined actions related to detected emotions at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method executed by a computer comprising a processor and a memory, the method comprising:
   receiving valid authentication information for a card associated with an account;
   capturing a first image of a person presenting the card;
   applying an algorithm to the first image to determine that: (i) the image capture was successful, and (ii) the first image can be used by a facial recognition algorithm;
   verifying that the first image of the person presenting the card matches an image of an authorized user of the account based on the facial recognition algorithm applied to the first image and the image of the authorized user;

analyzing image data of the first image with a facial emotion recognition algorithm to detect a first emotion expressed by the person in the first image;

identifying a first emotion rule associated with the account and the first emotion;

transmitting, by the processor, a short message service (SMS) alert to a registered user of the account to control access to the account based on the first emotion rule associated with the account and the first emotion, wherein the SMS alert is specified as part of the first emotion rule; and preventing a withdrawal of funds from the account.

2. The method of claim 1, further comprising one or more of:

(i) restricting a withdrawal of funds by the person to a predefined threshold amount, and (ii) restricting display of a current balance of the account.

3. The method of claim 2, further comprising alerting the registered user of the account by each of: (i) an email alert, and (ii) a telephonic alert.

4. The method of claim 1, wherein the authentication information comprises, in respective instances, each of: (i) a PIN number, (ii) a retinal scan, (iii) a DNA sequence, (iv) a palm print scan, (v) an iris scan, (vi) a hand geometry, and (vii) a fingerprint scan.

5. The method of claim 1, wherein verifying the first image comprises performing a facial recognition analysis using the facial recognition algorithm applied to the first image and the image of the authorized user.

6. The method of claim 1, wherein account information stored on one or more servers identifies a plurality of people as authorized users, wherein each person of the plurality of people has a respective set of stored emotion rules and actions, wherein each emotion rule is associated with at least one facially expressed emotion, wherein each person of the plurality of people has a respective set of account controls stored on the one or more servers.

7. The method of claim 1, wherein analyzing the first image comprises analyzing one or more frames of a video stream including the captured image to detect the emotion.

8. The method of claim 1, wherein the first image is a first frame of a video stream, the method further comprising:

analyzing image data of a second image with the facial emotion recognition algorithm to detect a second emotion expressed by the person, wherein the second image is a second frame of the video stream, subsequent to the first frame of the video stream;

identifying a second emotion rule associated with the account and the second emotion; and restricting a withdrawal of funds from the account to control access to the account based on the second emotion rule associated with the account and the second emotion, wherein the restriction is specified as part of the second emotion rule.

9. The method of claim 1, the method further comprising:

outputting, to the person presenting the card, an indication to capture a second image of the person presenting the card upon determining at least one of: (i) that the image capture was not successful, and (ii) that the first image cannot be used by a facial recognition algorithm; and upon determining that a predefined number of unsuccessful attempts to capture an image of the person presenting the card has occurred, restricting access to the account.

* * * * *